(12) United States Patent
Gelmetti

(10) Patent No.: US 7,441,657 B2
(45) Date of Patent: Oct. 28, 2008

(54) COVER FOR A WELDING WIRE CONTAINER

(75) Inventor: Carlo Gelmetti, Lazise (IT)

(73) Assignee: Sidergas Spa (IT)

( * ) Notice: Subject to any disclaimer, the term of this patent is extended or adjusted under 35 U.S.C. 154(b) by 231 days.

(21) Appl. No.: 11/279,517

(22) Filed: Apr. 12, 2006

(65) Prior Publication Data

US 2006/0260965 A1 Nov. 23, 2006

(30) Foreign Application Priority Data

Apr. 21, 2005 (DE) ......... 10 2005 018 566

(51) Int. Cl.
*B65D 85/04* (2006.01)
*B65H 18/28* (2006.01)
(52) U.S. Cl. ............... 206/393; 206/407; 206/409; 242/160.2; 242/170; 242/172

(58) Field of Classification Search ............. 206/389, 206/391, 393, 397, 407–409; 242/129.5, 242/131–140, 160.1–160.4, 170–172, 586, 242/587
See application file for complete search history.

(56) References Cited

U.S. PATENT DOCUMENTS

| | | | | |
|---|---|---|---|---|
| 1,468,994 A * | 9/1923 | Cook | ............. | 206/393 |
| 2,477,059 A * | 7/1949 | Hill | ............. | 242/137.1 |
| 2,580,900 A * | 1/1952 | Epstein | ............. | 206/409 |
| 2,984,596 A * | 5/1961 | Franer | ............. | 206/412 |
| 3,352,412 A * | 11/1967 | Draving et al. | ............. | 242/170 |
| 6,715,608 B1 | 4/2004 | Moore | | |
| 6,938,767 B2 * | 9/2005 | Gelmetti | ............. | 206/408 |
| 7,309,038 B2 * | 12/2007 | Carroscia | ............. | 242/170 |
| 2003/0052030 A1 * | 3/2003 | Gelmetti | ............. | 206/397 |
| 2004/0155090 A1 * | 8/2004 | B.-Jensen | ............. | 228/41 |

FOREIGN PATENT DOCUMENTS

JP 2000-225468 8/2000
WO WO 02/094493 11/2002

* cited by examiner

*Primary Examiner*—Bryon P Gehman
(74) *Attorney, Agent, or Firm*—Hayes Soloway P.C.

(57) ABSTRACT

A cover for a welding wire container has a top side and a slot in the top side. The slot allows for welding wire to be pulled from a welding wire container. On the outside of the cover, a holding-down device is provided. The holding-down device is adapted to hold an end portion of the welding wire in flat contact with the cover.

10 Claims, 2 Drawing Sheets

COVER FOR A WELDING WIRE CONTAINER

The invention relates to a cover for a welding wire container and to a welding wire container including a cover.

BACKGROUND OF THE INVENTION

A welding wire for automatic welding machines is provided in coils which each are placed in a container. A cover is provided on the container to prevent that dirt or any other contaminations reach the interior of the container. The cover normally is made of cardboard or plastic.

In order to be able to continuously feed the welding wire to the welding machine, it is known to use two containers, in fact a first container which currently provides the welding wire, and a second container which is employed as soon as the wire from the first container is completely used up. The end of the welding wire of the first container is connected with the start portion of the welding wire of the second container, so that a continuous feeding of the welding wire is ensured. When the first container is empty and the welding wire is withdrawn from the second container, the first container is replaced by a new one, and the start portion of the welding wire of the new container is connected with the end portion of the welding wire of the container which is currently employed.

It is important for the proper function of such a system that the welding wire does not entangle or develop kinks, in particular when the welding wire of a container has been used up almost completely so that the short residual portion of the welding wire is withdrawn from the container. With known systems, there isn't provided any cover on the container in order to ensure a proper changeover from one container to the other. Using an open container, however, results in soiling the welding wire.

PCT publication WO 02/094493 shows a system including two containers, in which a rider is disposed on the welding wire. The rider is a solid body and is supposed by means of its weight to avoid any kinks in the wire. It has been found, however, that this solution does not work satisfactorily.

It is the object of the invention to provide a cover for a welding wire container, which prevents an entangling of the welding wire or kinks in it, especially in case the system changes over from one container to the other, while it is made possible at the same time to use a cover for closing the container.

BRIEF DESCRIPTION OF THE INVENTION

To this end, the invention provides a cover for a welding wire container, which has a top side and a slot in the top side. The slot allows to pull welding wire from the container. On the outside of the cover, a holding-down device is provided. The holding-down device is adapted to hold an end portion of the welding wire in flat contact with the cover. The invention is based on the cognition that it is possible to combine a cover for the container, to prevent the penetration of dirt and other contaminations into the latter, with a device for preventing entanglements of the wire and kinks in it, in particular in the phase in which the system changes over from one container to the other. The invention essentially consists in the employment of a slot through which the welding wire—when it is used up completely—can leave the container, and a holding-down device which holds the welding wire in flat contact on the container. This holding-down device ensures that the welding wire is fixed in a suitable position on the cover; the wire can come off the latter, however, when there occurs a change-over from one container to the next during pulling out the welding wire. This ensures a trouble-free change from one welding wire container to the next. In case the welding wire would not be fixed on the cover, the comparably long transition portion of the welding wire between two containers could get caught on other parts, for instance under a corner of the cover, or could develop kinks or also contact other metallic parts in the vicinity of the container which would result in a short-circuit.

The holding-down device can be integrated in the cover, attached to it immovably or in such a manner that it can be detached from the cover. The holding-down device could be constituted by an adhesive label, for instance, by means of which the welding wire is fixed on the cover. The holding-down device could also be a flexible element which is formed in one piece with the cover or is attached to the latter and fixes the welding wire in the desired position. Depending on the respective conditions it is also possible to employ more than one holding-down device.

Advantageous designs of the invention will be apparent from the dependent claims.

BRIEF DESCRIPTION OF THE DRAWINGS

The invention will now be described in detail on the basis of a preferred embodiment illustrated in the drawings in which.

DETAILED DESCRIPTION OF THE INVENTION

Figure 1:
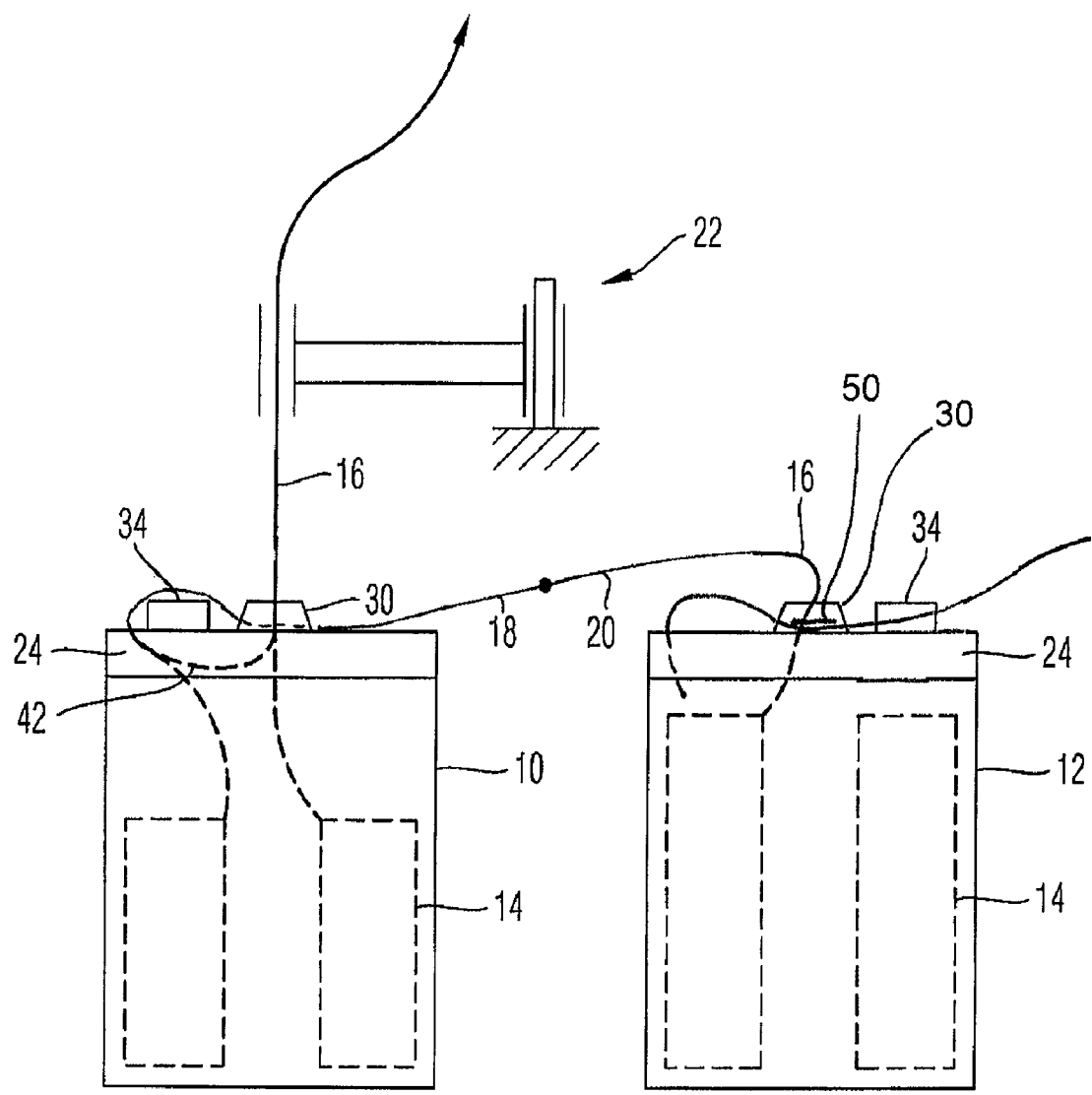
FIG. 1 is a side view of a system which employs two welding wire containers with covers according to the invention.

FIG. 1 shows a first welding wire container 10 and a second welding wire container 12. Both welding wire containers hold a coil 14 of a welding wire 16. The end portion 18 of the welding wire contained in the first container 10 is butt-welded with the start or front portion 20 of the welding wire coil contained in the second container 12. The welding wire 16 is withdrawn from the welding wire containers 10, 12 by a supply system 22 which is only schematically shown.

A cover 24 (see also FIGS. 3 and 4) is disposed on each container 10, 12. Each cover has an upper surface 26 closing an upper opening of the respective container, and side walls 28 which extend from the upper surface 26 and position the cover on the respective container.

Figure 3:
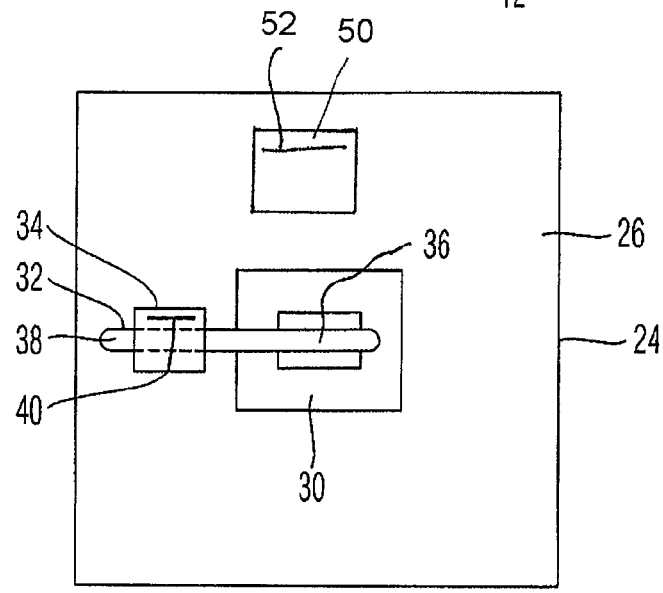
FIG. 3 shows in an enlarged top view a cover according to the invention.
Figure 4:
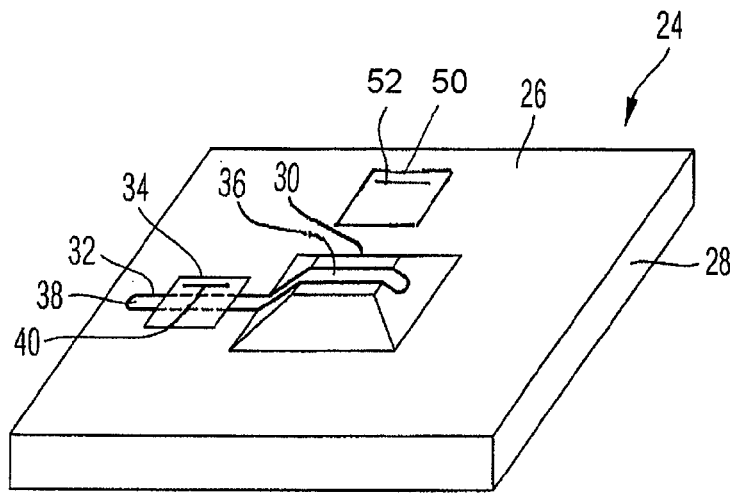
FIG. 4 is a perspective view of the cover illustrated in FIG. 3.

Provided in the center of the upper surface 26 is a truncated pyramid 30. There further is provided a slot 32 in the upper surface 26. The slot 32 extends from an edge of the cover 24 towards the center of the upper surface 26 and beyond it. As can be seen in FIGS. 3 and 4, the slot 32 extends across the left side surface and the upper surface of the truncated pyramid 30 and almost across the entire right side surface.

A retainer 34 is provided on the upper surface of the cover. The retainer 34 divides the slot 32 into an inner portion 36 and an outer portion 38. The welding wire supply to the welding machine runs through the inner portion 36 of slot 32, and the end portion, of the welding wire coil, which is connected with the front end of the succeeding welding wire coil, runs through the outer portion 38 of the slot 32.

In the preferred embodiment the retainer 34 is formed from a plate made of plastic, which is fastened to the upper surface 26 of the cover 24 only on one side of the slot 32. This fastening is schematically shown in FIGS. 3 and 4 by the reference symbol 40.

A holding-down device 50 is provided on the upper surface 26 of the cover so as to have an offset to the retainer 34 of approximately 90°. The holding-down device is likewise formed from a plate of plastic, which is attached on one side to the upper surface 26 of the cover, for instance by a weld seam or several rivets. This is schematically shown here as joint 52. The joint is provided on that side of the holding-down device which faces the outer rim of the cover.

Figure 2:
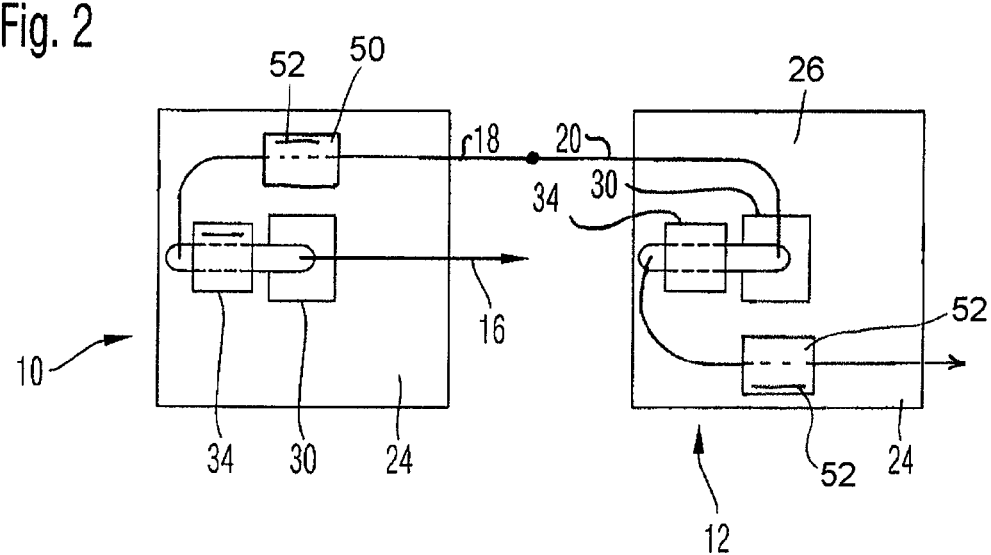
FIG. 2 is a top view of the system of FIG. 1.

The current start portion is withdrawn in upward direction by the supply system 22. The end portion of the welding wire of this active container is guided out of the container towards outside through the outer portion 38 of the slot, with the retainer 34 ensuring that the end portion does not get entangled with the start portion. As can be seen in FIG. 3, the end portion of the welding wire, after having passed through the slot, is bent slightly and clamped so as to lie underneath the holding-down device 50. As the welding wire springs outwards owing to its elasticity, it will be wedged under the holding-down device 50 by itself until it rests against the joint 52. The holding-down device guarantees that the end portion of the welding wire does not straighten up and get entangled with the supply device 22, for instance, which could result in a short-circuit; in fact, it runs in flat extension along the cover towards the second welding wire container (in FIGS. 1 and 2 shown on the right-hand side) which is still inactive. There it is connected with the start portion of the welding wire. In this way it is possible to connect more than two welding wire containers in series.

During operation the welding wire is withdrawn from the respective container through the inner portion 36 of the slot. When the welding wire stored in the respective container is completely used up, there will only be a small loop 42 of the welding wire which remains in the container (see FIG. 1). The retainer 34 ensures that the welding wire portion which extends to the succeeding welding wire container stays away from the portion which is currently withdrawn from the container. This prevents possible entanglements and kinks in the welding wire. When the welding wire is further withdrawn from the container, the loop 42 turns the retainer 34 upward, in fact at the side opposite the fastening 40, so that the welding wire leaves the first container completely. It occurs at the same time that the welding wire slips out of the holding-down device 50, because the latter is turned upward. The system then continues to automatically withdraw the welding wire, now from the second container.

The cover may immediately be reused, because it will not be destructed or damaged in the course of the change-over from one container to the next.

The invention claimed is:

1. A welding wire container cover, having a top side, a slot in said top side, said slot allowing for welding wire to be pulled from a welding wire container upon which said cover is mounted, said slot being elongate so as to allow a loop of welding wire to escape therethrough, holding-down device which is provided on an outside surface of said cover, said holding-down device being adapted to hold an end portion of a welding wire in flat contact with said cover, said holding-down device being a plate which is fastened to the outside surface of said cover only on one side of the plate.

2. The cover of claim 1 wherein said holding-down device is configured such that a holding-down effect exerted from said holding-down device on a welding wire can be overcome by the welding wire.

3. The cover of claim 1 wherein said holding-down device is fastened to the outside surface of said cover in such a manner that it can be detached from said cover at least in part.

4. The cover of claim 1 wherein said holding-down device is formed of a destructible material.

5. The cover of claim 1 wherein said holding-down device is weld to said cover.

6. The cover of claim 1 wherein said holding-down device is riveted to said cover.

7. The cover of claim 1 wherein said holding-down device is formed of a plastic material.

8. The cover of claim 1 further including a retainer dividing said slot into two portions.

9. The cover of claim 8 wherein said retainer and said holding-down device, taking a center of said cover as a reference, are arranged at an angle of approximately 90° with respect to each other.

10. An assembly for delivery of welding wire, said assembly consisting of at least first and second welding wire containers for accommodating a welding wire coil and each covered by a cover according to claim 1, said first of said containers being a container which will provide welding wire currently being used, wherein an end portion of welding wire coming from said first container runs through the slot provided in said cover of said first container to the outside of said first container, is fixed under said holding-down device of said cover of said first container, and runs toward said second container, a start portion of welding wire of said second container being connected with said end portion of said welding wire coming from said first container.

* * * * *